Patented July 14, 1936

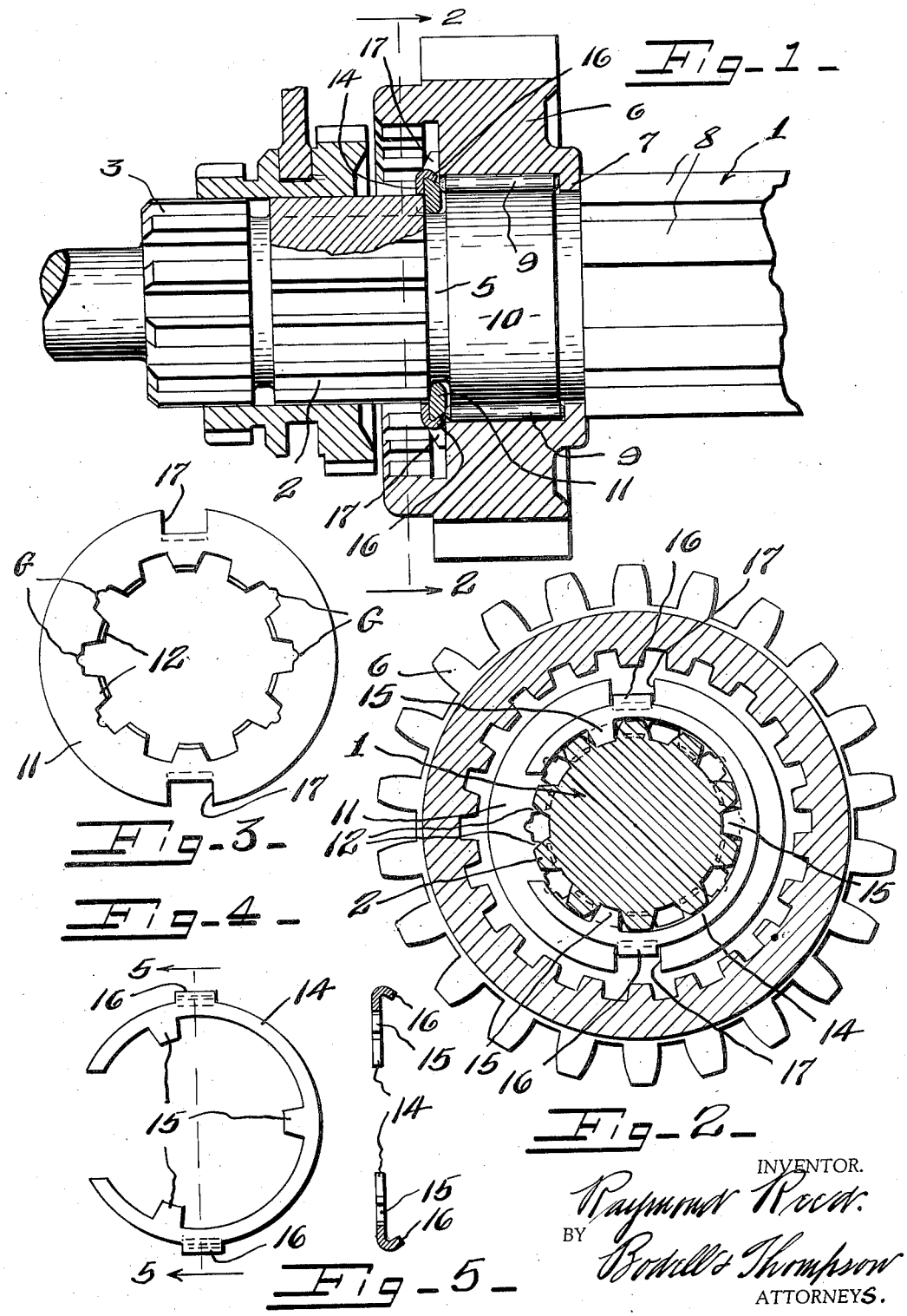

2,047,706

UNITED STATES PATENT OFFICE 2,047,706

LOCK FOR HOLDING GEARS ON SHAFTS

Raymond Reed, Toledo, Ohio, assignor to Spicer Manufacturing Corporation, Toledo, Ohio, a corporation of Virginia Application June 19, 1934, Serial No. 731,304

6 Claims. (Cl. 308—163)

This invention relates to means for retaining gears on shafts, and more particularly to means for holding the gear or other element on the shaft of a transmission gearing from axial displacement, and has for its object, a retaining means consisting of two parts, one, a thrust or retaining member or ring interlocking with the shaft on which the gear is mounted, against axial movement, and the other, a lock member, as a snap ring interlocking with the shaft against rotary movement and the members interlocking together to hold the thrust member or ring against rotary shifting on the shaft, when interlocked therewith, and to hold the lock member against axial shifting.

A further object is a retaining means which requires no weakening of the shaft by boring holes to retain plunger locks and the like heretofore used.

It further has for its object a retaining means or ring which is moved into position along the splines formed on the shaft and locked in position by a member which interlocks with the splines and requires no additional borings of the shaft.

It further has for its object a retaining means including a ring or washer having internal teeth for moving through the splines of the shaft and into a circumferential groove adjacent the gear and shiftable circumferentially to carry the internal teeth, so that they abut against the ends of the splines and act as thrust shoulders, and means for holding the ring in its shifted position, this means preferably coacting with a snap action with the washer, so that the lock ring holds the retaining ring in position and the retaining ring holds the lock ring in position.

The invention consists in the novel features and in the combinations and constructions hereinafter set forth and claimed.

In describing this invention, reference is had to the accompanying drawing in which like characters designate corresponding parts in all the views.

Figure 1 is a fragmentary elevation, partly in section, showing this retaining means applied to a gear on the main or transmission shaft of a transmission gearing.

Figure 2 is a sectional view on line 2—2, Figure 1, showing the locking means in elevation.

Figure 3 is a detail view of the retaining ring or washer.

Figure 4 is a detail view of the locking member or snap ring.

Figure 5 is a sectional view on line 5—5, Figure 4.

Although I have shown my invention as applied to a gear on the main shaft of a transmission gearing, such as is used in motor vehicles, nevertheless it is equally applicable to other situations.

I designates the main shaft of a transmission gearing, this, as will be understood, being journalled in the rear wall of the gear box and at its front end it has a pilot bearing in the drive shaft of the gearing, which shaft is journalled in the front wall of the gear box. This shaft is usually formed with sets of splines 2, 3, coacting with internal splines on the main or high speed clutch of the gearing. The shaft is also provided with a circumferential groove 5 at the ends of the splines 2 opposed to the gear 6 or the bearing for the gear 6. The gear 6 is here shown as rotatably mounted on the shaft 1 and as provided with an internal flange 7 which thrusts, to the right, against the ends of a set of splines 8.

Also, in the illustrated embodiment of my invention, an anti-friction or roller bearing 9 is interposed between the gear 6 and the bearing surface 10 on the shaft 1.

The flange 7 thrusts in one direction against the ends of the splines 8 holding the gear from axial displacement in one direction, as to the right, and the gear is held from axial displacement in the other direction, by means forming the subject matter of this invention.

This means includes a retaining ring or washer 11 having internal teeth 12 for passing through the spaces between the splines 2 to permit the retaining or thrust ring to be moved axially into and out of its operative position, and the teeth to move into the groove 5, and then shifted circumferentially to carry the teeth 12 into a position into alinement with the splines to abut against the ends of the splines 2 and serve as shoulders to hold the ring from axial displacement to the left (Figure 1).

The splines 2 and teeth 12 constitute broadly means on the shaft and retaining ring or washer 11, interlocking to hold the ring or washer from axial displacement.

The retaining or thrust ring 11 is held in its operative position by means which interlock with the splines 2 and also with the ring 11 when in its operative position with the internal teeth 12 abutting against the ends of the splines 2. This means is here shown as an expansible and contractile member, as a snap ring or a split ring, having internal teeth which interlock with the splines 2 and also means which interlock with the retaining ring or washer 11 with a snap action.

14 designates the locking member or snap ring, this being resilient, expansible and contractile and having internal teeth at 15 at suitable intervals which interlock with the splines 2 and which slide between the splines, when bringing the snap ring 14 into and out of its operative position. The snap ring 14 is also provided with external hooks or shoulders 16, preferably two located diametrically opposite each other, which interlock in peripheral notches 17 formed in the retaining ring 11. The internal teeth 12 of the retaining ring and the internal teeth 15 of the snap ring are so located that the hooks or shoulders 16 can not become alined with or snap into notches 17 until the retaining ring is shifted circumferentially to bring its internal teeth 12 into abutting relation to the ends of the splines 2. The teeth 15 and the splines constitute means for interlocking to hold the snap ring from rotary movement relative to the shaft. The ring 12 is split for the purpose of making it expansible and contractile in order that the hook 16 may be moved into and out of the notches 17 of the ring 11, thus eliminating the necessity of bending the shoulders 16 into the notches, after the two rings 14 and 11 are brought into juxtaposition or out of the notches when the parts are to be disassembled.

In operation, the gear 6 is slid on the shaft (to the right) until the flange 7 abuts against the ends of the splines 8 and the roller bearings 9 are then inserted. The retaining ring 11 is then placed in position with the internal teeth 12 in the groove 5 and shifted so that these teeth 12 abut against the ends of the splines 2. The snap ring is then slid along the shaft with its teeth 15 interlocked with the splines 2, and expanded so as to carry the teeth into the notches 17 of the retaining ring 11 and allowed to contact. The bottoms of the notches 17 are formed bevelled and the shoulders 16 complementally bevelled so that the shoulders 16 not only interlock with the side walls of the notches 17 but also with the bevelled bottoms of the notches 17, thus constituting broadly, means on the thrust or retaining ring 11 and on the lock or snap ring 14 for interlocking to hold the snap ring from axial displacement and the thrust ring from rotary displacement.

After the thrust ring 11 has been located in the groove 5 and turned so that its teeth 12 abut against ends of the splines, the lock ring 14 is so placed that the internal teeth 15 thereof, when interlocking with the splines of the shaft, locate the shoulders or hooks 16 in alinement with the notches 17 of the thrust ring so that when the lock ring 14 is expanded slightly, these shoulders or hooks 16 will pass through the notches 17, and when the lock ring 14 snaps or contracts, these hooks will interlock in the notches 17 thereof against rotary displacement, and the ends of the hooks or shoulders 16 interlock with the beveled bottoms of the notches 17 and hold the lock ring 14 from axial displacement. The teeth 15 are so located relatively to the notches or the notches 17 so located relatively to the internal teeth 12 of the thrust ring 11 that the shoulders 16 can not be brought into alinement with the notches 17, except when the thrust ring 11 has been given a partial turn to bring the teeth 12 into abutting relation with the ends of the splines. It will be noted, upon reference to Figures 3 and 4, that the notches 17 are in radial alinement with two of the internal teeth 12 of the thrust ring 11 and that the shoulders or hooks 16 of the snap ring 14 are out of radial alinement with the internal teeth 15 of the snap ring 14. The internal teeth of the thrust ring 11 and the snap ring 14 fit into splines of the same shaft. It is apparent that due to their relative radial arrangement, the shoulders or hooks 16 can not be brought into alinement with the notches 17 unless the thrust ring 11 has been turned to bring its internal teeth 12 into abutting relation or into alinement with teeth or splines of the shaft.

Owing to this construction, the retaining ring is readily applied and removed when necessary, as to remove it it is merely necessary to expand it to unhook from the retaining ring, then slide it out along the splines 2. The retaining ring can then be given a partial rotation to aline its internal teeth with the spaces between the splines 2 and then slid out of position. The reverse of these movements replaces the thrust or retaining and the snap ring.

As shown in Figure 3, the spaces between the teeth 12 are formed with grooves or notches G in their bottoms. These grooves or notches were primarily for a type of lock heretofore used, wherein a spring pressed plunger is located in a radial bore in the shaft, the plunger serving to lock a retaining ring occupying the same position as the ring 11 from axial displacement. The groove serves as a passage for a wire or other tool to depress the spring pressed plunger when it was desired to remove the retaining ring and the gear.

By applicant's lock, the plunger and the hole drilled in the shaft for the plunger are eliminated, thus eliminating the defects resulting in drilled shafts caused by localizing fatigue stresses resulting in the formation of cracks during heat treatment and straightening.

The groove G, which is left in the retaining ring, permits this retaining ring to also be used in transmission gearings, if desired, where the drilled hole for the plunger lock is provided in the shaft, but the groove G forms no part of this invention.

The construction of the retaining ring herein described and claimed is advantageous in that it results in a more economical construction and more convenient assembling and disassembling of the parts.

What I claim is:

1. The combination with a shaft and a rotatable element on the shaft; of means for holding said element from axial displacement including a thrust ring slidable axially of the shaft into and out of operative position, the shaft and the thrust ring having means for interlocking upon partial rotary movement of the ring when in operative position to hold the ring against axial displacement, and a lock member slidable along the shaft, the shaft and lock member having interlocking means for holding the lock member from rotary movement relative to the shaft, the thrust ring and the lock member having means for interlocking to hold the thrust ring from rotary shifting movement relative to the shaft and to hold the lock member from axial shifting movement.

2. The combination with a shaft and a rotatable element on the shaft; of means for holding said element from axial displacement including a thrust ring slidable axially of the shaft into and out of operative position, the shaft and the thrust ring having means for interlocking upon partial rotary movement of the ring when in operative position to hold the ring against axial displacement and a lock member slidable along the shaft, the shaft and lock member having interlocking means for holding the lock member from rotary movement relative to the shaft, the thrust ring and the lock member having means for interlocking to hold the thrust ring from rotary shifting movement relative to the shaft, and to hold the lock member from axial shifting movement, the interlocking means between the thrust ring and lock member being so located relative to the interlocking means between the shaft and the thrust ring, and the interlocking means between the shaft and the lock member, as to come into coacting position only when the thrust ring is interlocked with the shaft against axial shifting.

3. The combination with a shaft, and an element mounted on the shaft, the shaft being formed with splines on the portion thereof at one side of said element and with a circumferential groove adjacent said element and at the ends of the splines; of means for holding said element from axial displacement including a retaining ring having internal teeth for passing between the splines and into the groove, the ring being movable about its axis to shift the teeth thereof into alinement with the splines, whereby the teeth of the ring form shoulders thrusting against the ends of the splines, and single means interlocking with the splines and with the ring for holding the ring in its shifted position and the last means from axially shifting.

4. The combination with a shaft, an element mounted on the shaft, the shaft being formed with splines on the portion thereof at one side of said element and with a circumferential groove adjacent said element and at the ends of the splines; of means for holding said element from axial displacement including a retaining ring having internal teeth for passing between the splines into the groove, the ring being movable about its axis to shift the teeth thereof into alinement with the splines whereby the teeth of the ring form shoulders thrusting against the ends of the splines, and an expansible and contractile snap ring having teeth for interlocking with the splines and shoulders for interlocking with the ring when the latter is in its shifted position, the retaining ring having notches for receiving said shoulders, the shoulders and notches interlocking to also hold the snap ring from axial displacement.

5. The combination with a shaft, an element mounted on the shaft, the shaft being formed with splines on the portion thereof at one side of said element and with a circumferential groove adjacent said element and at the ends of the splines; of means for holding said element from axial displacement including a retaining ring having internal teeth for passing between the splines into the groove, the ring being movable about its axis to shift the teeth thereof into alinement with the splines whereby the teeth of the ring form shoulders thrusting against the ends of the splines, and an expansible and contractile snap ring having teeth for interlocking with the splines and shoulders for interlocking with the ring when the latter is in its shifted position, the retaining ring having notches for receiving said shoulders, the shoulders and the notches being formed to interlock to hold the snap ring from axial displacement.

6. The combination with a shaft and a rotatable element mounted on the shaft, the shaft being formed with splines on the portion thereof at one side of said element and with a circumferential groove adjacent said element, of means holding said element from axial displacement including a retaining ring having internal teeth for passing between the splines and into the groove, the ring being movable about its axis to shift the teeth thereof into alinement with the splines, whereby the teeth of the ring form shoulders for thrusting against the ends of the splines, the ring being also formed with peripheral notches and a second ring for locking the retaining ring in its shifted position, the locking ring having internal teeth for passing between the splines of the shaft and shoulders interlocking with the notches and with the opposite side of the retaining ring to that on which the locking ring is located.

RAYMOND REED.